United States Patent [19]

Fotiadis et al.

[11] Patent Number: 4,516,678
[45] Date of Patent: May 14, 1985

[54] FLOPPY DISK CANISTER

[75] Inventors: Emanuel Fotiadis; Edward J. Kozol, both of Ft. Lauderdale; Tak L. Leung, Boca Raton; Robert J. Paul, Lighthouse Point, all of Fla.

[73] Assignee: International Business Machines Corporation, Armonk, N.Y.

[21] Appl. No.: 499,085

[22] Filed: May 27, 1983

[51] Int. Cl.$^3$ ............................................. B65D 85/57
[52] U.S. Cl. ................................. 206/444; 206/309; 206/459; 206/523; 360/99; 360/133
[58] Field of Search .................................. 206/53–55, 206/303, 307, 309, 387, 398, 402, 403, 405, 406, 408, 415, 444, 445, 453, 459, 523, 821, 507; 360/97–99, 133; 215/212; 220/301

[56] References Cited

U.S. PATENT DOCUMENTS

| | | | |
|---|---|---|---|
| 1,940,088 | 12/1933 | Harrison | 206/408 |
| 2,030,465 | 2/1936 | Nist | 206/303 |
| 2,335,766 | 11/1943 | Kinloch | 206/408 |
| 3,051,307 | 8/1962 | Hoey et al. | 206/408 |
| 3,465,875 | 9/1969 | McKelvey, Jr. | 206/444 |
| 3,668,658 | 6/1972 | Flores et al. | 340/174.1 C |
| 3,773,213 | 11/1973 | Fredrick | 206/507 |
| 3,980,178 | 9/1976 | Schidlowski | 206/523 |
| 4,059,198 | 11/1977 | Mumford | 215/212 |
| 4,142,863 | 3/1979 | Covington et al. | 422/63 |
| 4,282,973 | 8/1981 | Binkowski | 206/444 |
| 4,285,016 | 8/1981 | Gilovich | 360/98 |
| 4,316,281 | 2/1982 | Prusak | 206/309 |
| 4,434,891 | 3/1984 | Skinner et al. | 206/444 |
| 4,457,429 | 7/1984 | Huber et al. | 206/445 |

FOREIGN PATENT DOCUMENTS 7703171  9/1978  Netherlands ................. 206/459

Primary Examiner—George E. Lowrance
Assistant Examiner—Jimmy G. Foster
Attorney, Agent, or Firm—Francis A. Sirr

[57] ABSTRACT

A canister for holding a stack of floppy disks, during manufacture of diskettes, or during storage and shipment of the disks. The canister is impervious to ultraviolet radiation, and comprises a base and a deep cup-shaped cover which latches to the base during storage and/or shipment, and which is removed after the canister's base is coupled to the proper input station of a diskette manufacturing machine. The canister is adapted to hold disks of a number of different types, but all of the same size. For example, disks which have been burnished, but not tested, and disks which have been both burnished and tested are different type disks. The canister base is different colored, in accordance with the type disk which is to be held by the base. Also, the base carries a unique bar code and a unique mechanical interlock wall which identify the type disk to be held by the base. This bar code and mechanical interlock prevent coupling of an improper type disk's canister base to a given manufacturing machine input station.

19 Claims, 6 Drawing Figures

FLOPPY DISK CANISTER

DESCRIPTION

1. Field of the Invention

The present invention relates to the field of magnetic recording media which is known in the art as floppy disks, and to the manufacture of such disks into machine-usable diskettes, such diskettes having one disk permanently encased in a flexible or a rigid outer jacket.

2. Background and Summary of the Invention

The manufacture of diskettes has always been a generally two-step process (involving many minor steps of course). First, the disk per se is manufactured—second, the disk is encased in a protective jacket in which it thereafter remains during use.

U.S. Pat. No. 3,668,658 (incorporated herein by reference) shows such a flexible jacket diskette; whereas copending and commonly assigned copending patent application Ser. No. 391,060, filed June 22, 1982 (incorporated herein by reference), shows such a rigid jacket diskette. These diskettes are cited as examples only, and not by way of limitation of the present invention.

In the process of manufacturing diskettes of this general type, the skill of the art requires that steps be taken to avoid damage to the disks per se, while they await encasement into the diskette's protective outer jacket. Of course, the final diskette product must also be handled with care, during its many years of use; however, the disk per se is much more fragile outside of the jacket than it is once the disk is encased in the protective jacket.

U.S. Pat. No. 4,282,973 describes a storage and/or shipment package for a plurality of such disks per se. In this patent, a plurality of disks (10) are stacked, about two inches high, onto a mandrel (12). The resulting stack of disks is then removed from the mandrel, encased in a heat shrinkable bag(s), which bag(s) is then heat sealed. Thereafter, the disk/bag(s) assembly is protected by a foam collar (18). The disks are thus said to be protected from edge damage and particulate contamination.

While this aforesaid U.S. patent is of use for storage and shipment, the subsequent processing of individual disks into diskettes requires removal of the disk stack from the protective environment, whereupon damage may thereafter result.

Insofar as we are aware, we are the first to devise a floppy disk canister which is useful in storage and shipment, and which is additionally constructed and arranged for interlocked stacking of the canisters during storage and/or shipment; which contains the floppy disks in distinctively different canisters at various stages of diskette manufacture; which carries both human and machine-readable indicia (i.e., different human readable colors and different machine readable bar codes) to insure use of the proper canister (i.e., disks) at the proper diskette manufacturing machine station; which enables the canister to be opened, to expose the disks, after the canister is in position on the proper diskette manufacturing machine station; which is constructed and arranged to facilitate machine removal of the individual disks in the stack once the open canister is in position at the manufacturing machine station; and which is constructed of a material that shields the disks from ultraviolet radiation.

Known prior art exists where a shallow metal dish, with a removable bottom plate (much like the construction of certain well known cake-making pans) was used to transport magnetic recording disks from one diskette manufacturing station to another. The aforesaid bottom plate included a centrally located hole which accepted a machine-mounted post, about which the dish's disks are centered when the dish was mounted to the machine. Thus, the dish itself did not carry a central post; but rather, when the dish was in use at the disk-receiving station of a floppy diskette manufacturing machine, the machine's post operated to center the disks. The aforesaid dish included a colored area, functioning as human readable indicia, and a magnetic bar, functioning as machine readable indicia.

In the unrelated art of dispensing reagent slides into a chemical analyzer, U.S. Pat. No. 4,142,863 is known. In this patent, a container holds a number of test slides. This container is constructed and arranged to prevent improper placement of the container on the analyzer, and to prevent placing a container having improper slides on the analyzer. More specifically, the analyzer includes a nest (54), of generally square cross section, which is adapted to receive the slide container (10). This nest has two diametrically opposed internal channels (58, 60), one (60) of which is wide and the other (58) of which is narrow. The slide container includes two pairs of diametrically opposed, spaced rails, one pair (50, 52) of which one is narrowly spaced, and the other pair (46, 48) of which is widely spaced. Thus the container can be inserted into the nest in one way only.

Further, each container carries a notch code identifying the type slide carried by that container. More specifically, a notched web (70, 72) extends between the aforesaid rails of each pair of rails. The nest includes a series of holes (62, 64) into which pins (66, 68) are selectively placed, in accordance with the type test to be performed. If the container's notched webs do not contain the proper notch configuration, the container's web(s) hit the pin(s), and the container cannot be inserted into the nest, even though the aforesaid rail pairs and internal channels are properly aligned.

The foregoing and other features and advantages of the invention will be apparent from the following more particular description of preferred embodiments of the invention, as illustrated in the accompanying drawing.

THE INVENTION

The canister of this invention is of a two-piece construction, comprising a bottom disk-supporting and locating member 10, and a cup-like cover 11. Both of these parts are preferably molded of a strong injection molded, thermoplastic polycarbonate resin, of which the brand LEXAN #141 is preferred (General Electric Co., Polymers Product Dept.).

This canister may be designed to hold any size floppy disk—for example disks of eight, five and one-quarter, or four-inch diameter. These disks are of a different type, as defined herein, in that one type disk may be unburnished, another may be burnished, another may be burnished and lubricated and yet another may be burnished, lubricated and tested—all of which types relate to disk manufacturing steps prior to the actual packaging of a disk into an outer jacket, to form a diskette.

Figure 3:
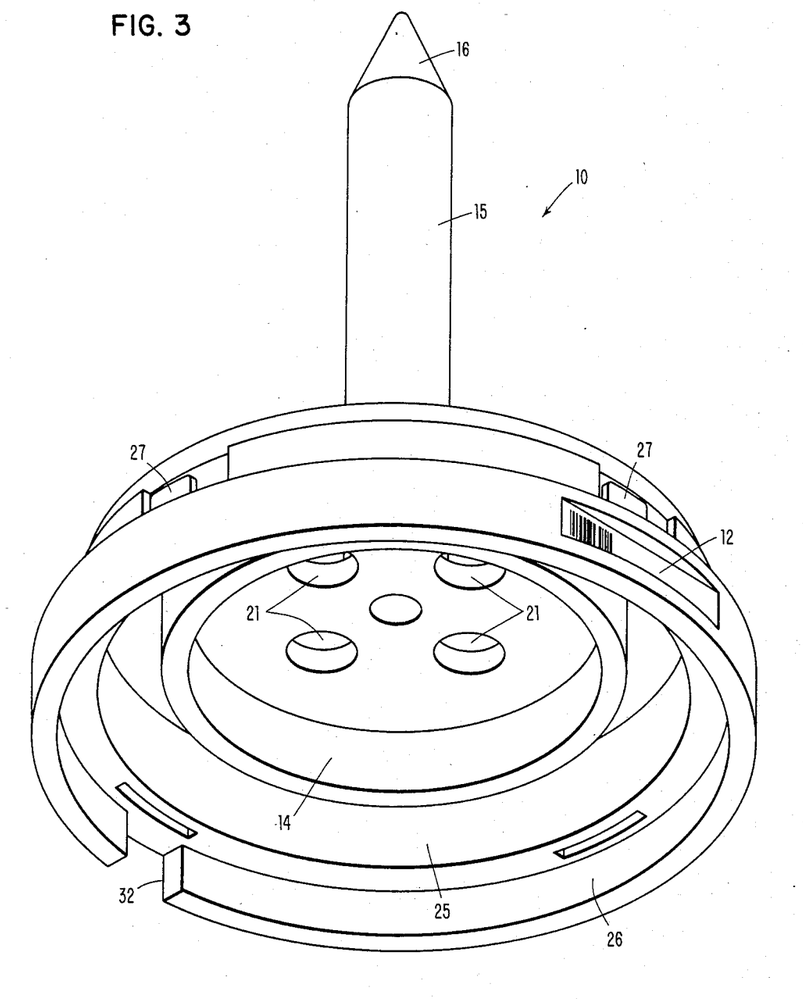
FIG. 3 is a bottom perspective view of the bottom member, and the bar code 12 and physical barrier interlock 14 carried thereby.

Base or bottom member 10 is constructed and arranged with three unique identifier features, as will be more apparent hereinafter. For the moment, it suffices to say that a number of different color bottom members 10 (for example: yellow, blue, green or red) are used in the manufacture of diskettes, such that the human operator is aware that the correct type disks are being placed at the correct input station (FIG. 5) of a diskette manufacturing machine. In addition, each bottom member 10 includes a flat, recessed surface 12 (FIG. 3) which carries a machine-readable bar code identifying the type of disk associated with this color bottom member. When the bottom member, and its disks, are mounted to the correct receiving station (FIG. 5) of the diskette manufacturing machine, a bar code reader 13 insures that only the proper disks can be supplied to (or received from) the machine at this station. Lastly, each bottom member 10 carries a physical-barrier interlock surface, in the form of an annular ring 14, which mates with a similar dimensioned annular recess 100 (FIG. 5) at only the correct station of the manufacturing machine. In FIG. 3, ring 14 is shown as continuous. Exemplary locations of three other rings, of progressively smaller diameter, and each corresponding to one, and only one, of the remaining three colors used to produce bottom members 10, would be used in making the other three base members. As will be apparent, the smaller-diameter ring(s) may be placed at or near openings 21, and thus the rings are formed of four separate sections.

Thus, it can be seen that each type canister is unique as to its color, bar code, and physical-barrier interlock.

Each bottom member 10 is identical in that each includes a flat, planar surface 24 (FIG. 2) upon which the stack of disks rests, and a centrally located disk-locating, circular-cylinder post 15 whose axis is perpendicular to surface 24. Post 15 terminates in a cone-shaped top 16. The dimensional length 17 of post 15 is adapted to contain one thousand floppy disks (see disks 34 of FIG. 1). It is preferable to use relatively thick nylon or Teflon disks 18 and 19 at the bottom and top, respectively, of the disk stack; and it may be desirable to separate adjacent disks with a thin spacer sheet, for example a sheet made of the state of the art wiping cloth which is incorporated into the diskette jacket itself. Interleaved separator sheets of this type are particularly useful if it is found that the disk's magnetic recording film tends to be smoothed, due to the weight of the stack of disks upon the bottom disks in the stack.

Preferably, post 15 is only slightly smaller than the centrally located collet opening 35 which is punched in each floppy disk.

Figure 2:
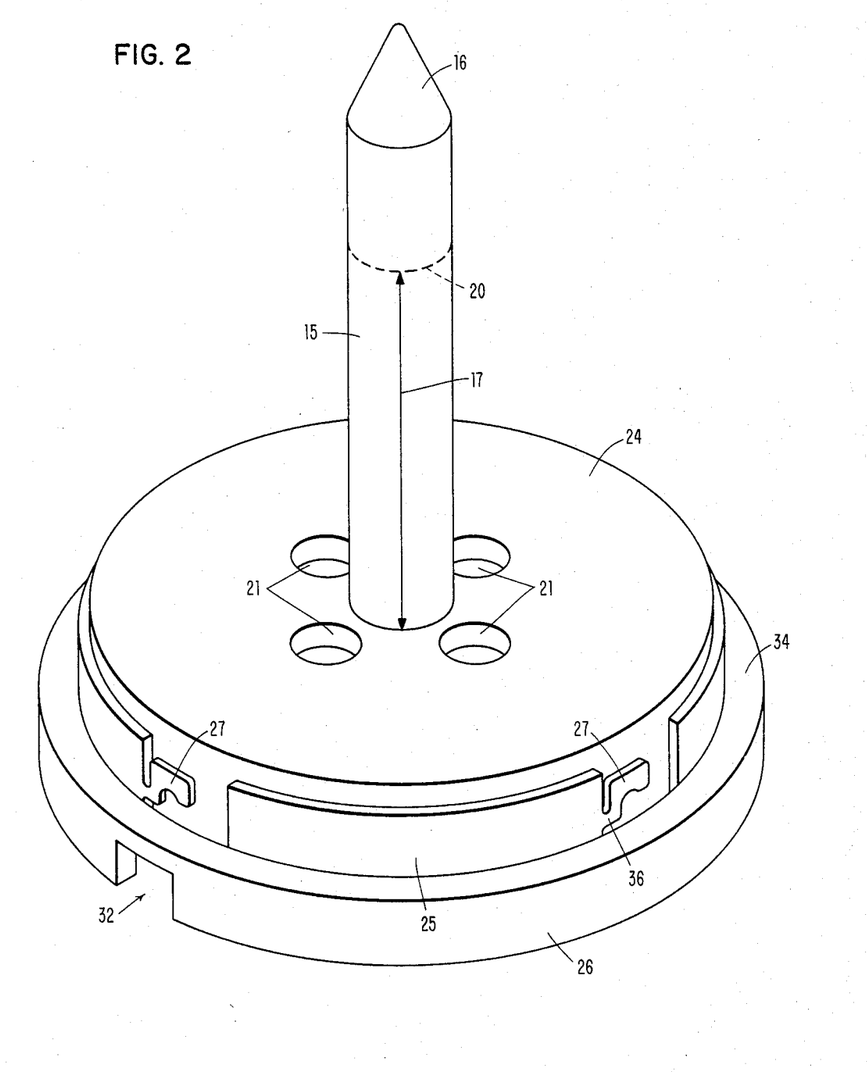
FIG. 2 is a top perspective view of the canister's opaque bottom member, and the cover catches 27 carried thereby.

While the details of a diskette manufacturing machine which uses bottom member 10, and its stack of disks, are not critical to the present invention, each base member 10 includes aperture means 21 by which the stack's bottom support disk 18 may be elevated so as to always keep the top disk of the stack at about FIG. 2's datum 20.

Such exemplary aperture means consists of four 90°-located openings 21 formed in each bottom member 10. Openings 21 lie on a circle which is concentric with the central axis of post 15, and these openings interrupt the continuity of inner physical-barrier ring(s) 14, causing the ring(s) to be formed by four ring sectors.

Figure 5:
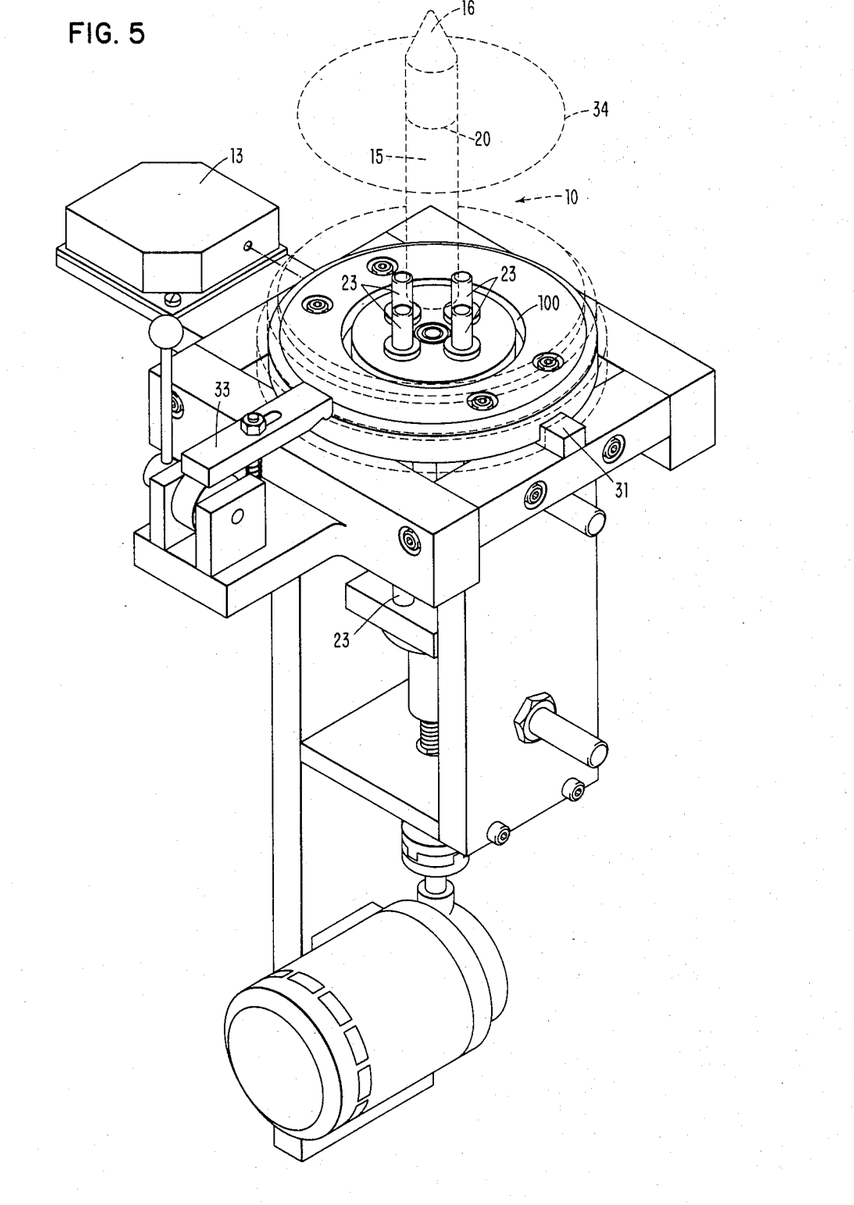
FIG. 5 shows a bottom member positioned on an input station of a diskette manufacturing machine.

FIG. 5 shows an exemplary means by which four vertical, movable, pusher posts 23, located at a manufacturing machine's input station, may enter openings 21 in order to elevate the stack of disks. We have found it desirable to also provide a jet(s) of ionized air, directed at the side of the stack of disks, and a vacuum picking means to pick the top disk from the stack. If separator sheets are used, as aforesaid, the vacuum picker is programmed to discard FIG. 1's top disk 19 and all separator sheets, while feeding all magnetic recording floppy disks into the manufacturing process.

The details of such a manufacturing machine are well known to those of skill in the art, and will not be described herein.

By way of an exemplary description of the operation of such a machine, and the way in which the canister of the present invention finds one of its many utilities, assume that the machine is constructed and arranged to have (1) a first input station adapted to receive new disks, one by one. These disks are then surface-burnished, and supplied, one by one, to (2) a first output station. A canister of the present invention, of a first (for example, yellow) color bottom member 10, a first bar code 12, and an annular ring 14 (FIG. 3) is the only canister that will fit onto this first input station (due to ring 14), and is the only canister whose bar code will read properly at the first input station. The above-mentioned first output station requires a different canister—i.e., one whose bottom member 10 is of a second color (for example, blue), and whose bar code is of a second type. In addition, its physical-barrier ring is of the next smaller diameter ring 14. Thus, this unique canister is the only one which will contain burnished disks.

The burnished disks are then placed in (3) a second input station where the disks are received, one by one. These disks are lubricated, and supplied one by one to (4) a second output station. In this case, the machine's second input station requires the aforesaid first output station canister—i.e., a canister having a blue bottom member 10, a bar code of said second type, and the defined physical-barrier ring 14. The aforesaid second output station, however, requires a third distinctively different canister—i.e., one of a third color (for example, green), having a third type bar code, and having a yet smaller diameter physical-barrier ring 14.

The burnished and lubricated disks now contained by the green bottom member 10 are now placed in (5) a third input station where the disks are received, one by one. The disks are now read/write tested to determine the quality of the disk's magnetic recording surface. At this point in the manufacturing process more than a single output station may exist—for example, different levels of disk "goodness" may exist, as evidenced by read-signal-strength, or certain disks may be certified for single-side recording, while others are certified for two-sided recording. However, for the purpose of this explanation, it will be assumed that good disks are supplied, one by one, to (6) a third output station, while unacceptable disks go to a reject output. As is now apparent, the aforesaid third input station requires the same canister (i.e., green) as does the machine's second output station. The aforesaid third output station, however, has its own unique canister—i.e., a canister whose bottom member 10 is of a fourth color, (for example, red), having a fourth type bar code, and having a still smaller physical-barrier ring 14.

The last manufacturing process is the one in which disks are inserted into the diskette's outer protective jacket, and the jacket is sealed. This final manufacturing machine input station is constructed and arranged to accept only the above-mentioned canister of the fourth color, fourth bar code, and small-diameter physical-barrier ring 14. The output from this station does not, of course, include a canister of the present invention, but rather comprises finished diskettes.

Figure 1:
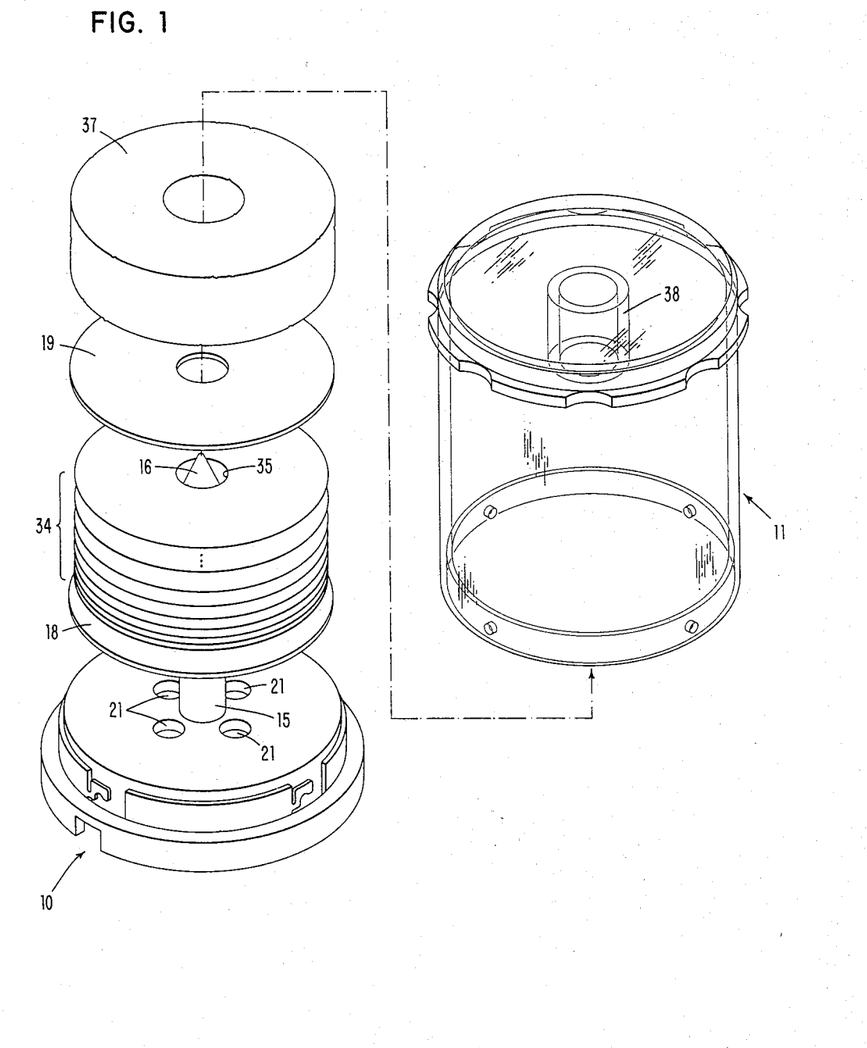
FIG. 1 is an exploded view of the present invention, showing the way in which disks 34 are contained thereby.

The flat, disk-shaped surface 24 of bottom member 10 is of a diameter only somewhat larger than the diameter of the floppy disks held thereby (see FIG. 1). In addition, surface 24 terminates at circular-cylinder annular ring extensions or walls 25 and 26 (FIG. 2) which define a shallow, downwardly opening, cup, which cup extends away from surface 24 in a direction opposite the direction of post 15. Wall 25 is of a smaller diameter than wall 26.

Wall 25 includes four 90°-located catches 27 which mate with pins 28 carried by cover 11. Catches 27 are molded to provide a flexible section 36.

Figure 4:
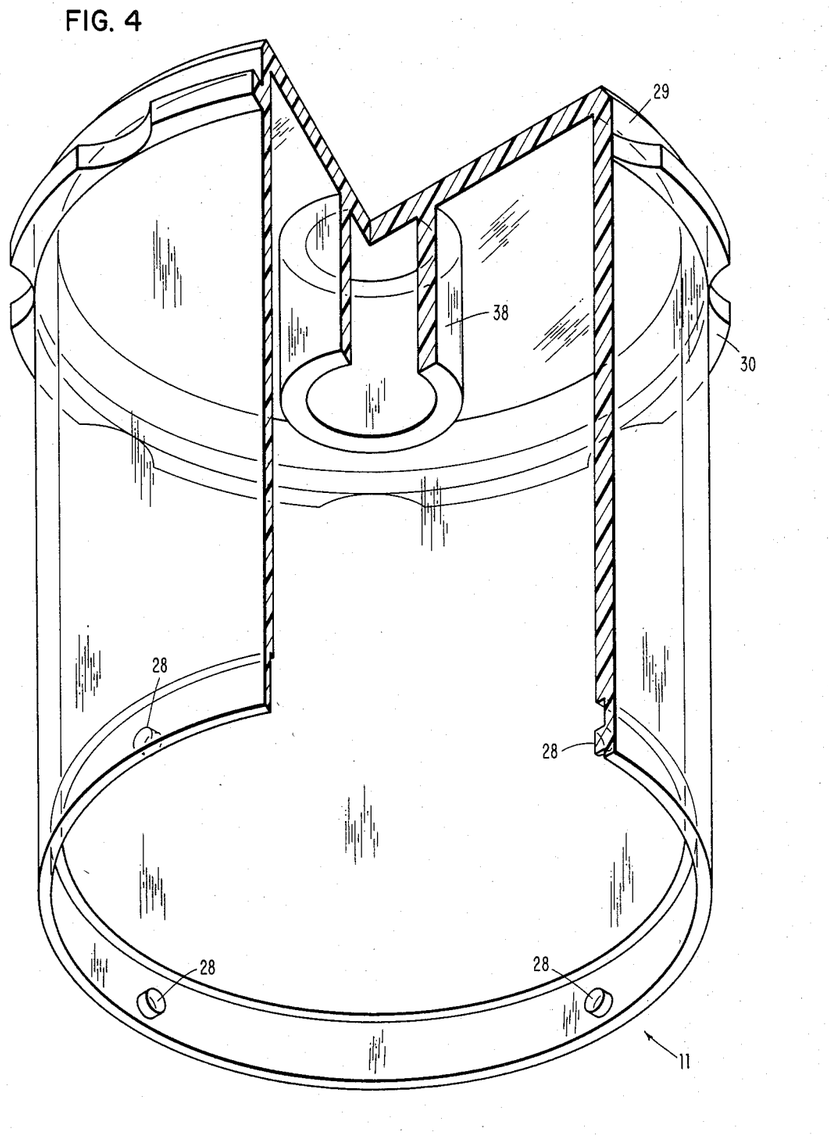
FIG. 4 is a bottom perspective and partially cutaway view of the canister's visually transparent cover member.
Figure 6:
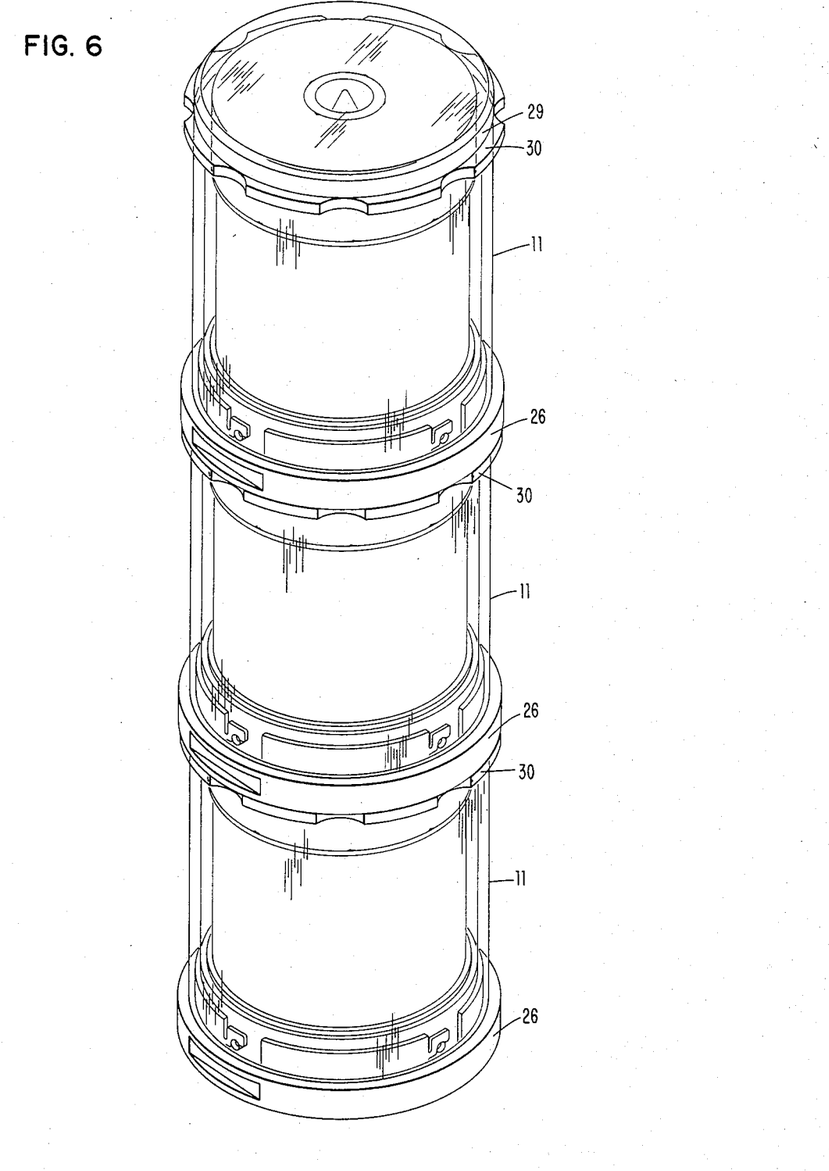
FIG. 6 shows a stack of canisters of the present invention.

Wall 26 has an inner diameter (FIG. 3) only somewhat larger than the external diameter of circular-cylinder cover 11 (FIG. 4). Thus, wall 26 cooperates with portion 29 of cover 11 to enable stacking of a number of canisters, as shown in FIG. 6.

Cover portion 29 terminates in a grooved annular wall 30. This wall comprises a means enabling convenient handling of the canister, supports wall 26 of bottom member 10, and enables manual twisting of cover 11 relative bottom member 10, to thereby release pins 28 from catches 27.

With reference to FIG. 5, each manufacturing machine input/output station includes a key 31 which mates with bottom member 10's keyway 32 (FIG. 3). Thus, bottom member 10 is held against rotation as cover 11 is rotated to release pins 28 from catches 27. In addition, a clamp means 33 is provided to clamp bottom member 10 to the machine's input/output station, by clamping against bottom member 10's annular ring surface 34 (FIG. 2). Surface 34 is parallel to surface 24.

It is known that magnetic recording media of the floppy disk type may deteriorate in the presence of ultraviolet light. Thus, bottom members 10, of whatever color, are preferably opaque, and cover 11, while being transparent to the human eye, is smoky colored so as to be impervious to ultraviolet light.

As stated previously, one of the many utilities of the present invention is the storage and/or shipment of a large number of floppy disks, prior to packaging the individual disks in outer jackets to form diskettes.

FIG. 1 shows the canister of the present invention in exploded view. A feature of the invention is the use of a foam rubber ring 37, and the manner in which compression of this ring, by coupling of cover 11 to bottom member 10, causes the stack of disks to be placed under a small compression load, which load prevents disk-to-disk movement during shipment and the like. As seen in this figure, cover 11 includes an internal, centrally located, circular-cylinder boss 38 which aligns with post 15 and receives the top of the post when the cover and the bottom member are coupled. Ring 37 includes a central opening 39 which encircles boss 38 in a close friction fit.

While the invention has been particularly shown and described with reference to preferred embodiments thereof, it will be understood by those skilled in the art that various changes in form and details may be made therein without departing from the spirit and scope of the invention.

What is claimed is:

1. A canister for holding a stack of floppy magnetic recording disks, comprising:

a stack of floppy magnetic recording disks;

a base member having a flat surface which is larger than said disks supporting said disk stack by way of a centrally located, upwardly extending post which forms a right angle to said flat surface, the cross section of said post substantially conforming to the collet opening which is formed in the center of the disks, said post being of a length to extend beyond the top disk in the stack, and said base member's flat surface having a boundary portion including cover latch means;

a relatively deep cover having a rim including latch means adapted to cooperate with the latch means of said base member's boundary portion; and compressible means located between the top disk of the stack and the internal top surface of said cover, and operable to be compressed as said cover is latched to said base member, to thereby provide a force which loads said disk stack so as to prevent relative movement between adjacent disks in said stack.

2. The canister defined in claim 1 wherein said cover includes an internally extending hollow boss adapted to receive and surrounds the upper end of said post when said cover is latched to said base member, said boss terminating short of the top disk in said stack.

3. The canister defined in claim 2 wherein said compressible means comprises a compressible foam pad which surrounds said tube, the relaxed state of said foam causing the same to engage the top disk in the stack, as said cover is placed on said base member so as to compress said pad as said cover is moved to its latched position.

4. The canister defined in claim 3 wherein said base member's flat surface is disk shaped, and only somewhat larger than the planar surface of said disks; wherein said boundary portion comprises a short circular-cylinder annular wall which extends away from said flat surface in a direction opposite to the direction of said post, said annular wall thereby defining a shallow, downwardly extending cup.

5. The canister defined in claim 4 wherein said cover is a deep cup-shaped cover formed by a deep circular-cylinder annular wall, whose inner diameter is only somewhat larger than the diameter of said disks, and by a substantially flat top surface;

the inner diameter of said short circular-cylinder annular wall being somewhat larger than the outer diameter of said deep circular-cylinder annular wall, to thereby facilitate stacking of a plurality of said canisters.

6. A canister for holding a stack of floppy magnetic recording disks, comprising:

a stack of floppy magnetic recording disks;

a base member having a flat surface which is larger than said disks supporting said disk stack by way of a centrally located, upwardly extending post which forms a right angle to said flat surface, the cross section of said post substantially conforming to the collet opening which is formed in the center of the disks, said post being of a length to extend beyond the top disk in the stack, and said base member's flat surface having a boundary portion including cover latch means;

a relatively deep cover having a rim including latch means cooperating with the latch means of said base member's boundary portion;

compressible means located between the top disk of said stack and the internal top surface of said cover, and operable to be compressed as said cover is latched to said base member, to thereby provide a force which loads said disk stack so as to prevent relative movement between adjacent disks in said stack; and human readable and machine readable indicia carried by said base member to define a characteristic of the disks held by said canister.

7. The canister defined in claim 6 wherein said cover includes an internally extending hollow boss adapted to receive and surround the upper end of said post when said cover is latched to said base member, said boss terminating short of the top disk in said stack.

8. The canister defined in claim 7 wherein said compressible means comprises a compressible foam pad which surrounds said tube, the relaxed state of said foam causing the same to engage the top disk in the stack, as said cover is placed on said base member so as to compress said pad as said cover is moved to its latched position.

9. The canister defined in claim 6 wherein said base member's flat surface is disk shaped, and only somewhat larger than the planar surface of said disks; wherein said boundary portion comprises a short circular-cylinder annular wall which extends away from said flat surface in a direction opposite to the direction of said post, said annular wall thereby defining a shallow, downwardly extending cup.

10. The canister defined in claim 9 wherein said human readable indicia comprise the color of said base member, and wherein said machine readable indicia comprise a bar code carried by said short circular-cylinder wall.

11. The canister defined in claim 10 wherein said cover is a deep cup-shaped cover formed by a deep circular-cylinder annular wall, whose inner diameter is only somewhat larger than the diameter of said disks, and by a substantially flat top surface;

the inner diameter of said base member's short circular-cylinder annular wall being somewhat larger than the outer diameter of said deep circular-cylinder annular wall, to thereby facilitate stacking of a plurality of said canisters.

12. The canister defined in claim 9 wherein said machine readable indicia include an extending wall portion formed inside of said shallow, downwardly extending cup.

13. The canister of claim 6 wherein said base member's flat surface is disk shaped and only somewhat larger in area than the surface area of a disk, said flat surface terminating in a first annular wall which extends away from said flat surface in a direction opposite to said post, and which carries said cover latch means, and wherein said human readable indicia comprise the color of said base member.

14. The canister of claim 13 including a second annular wall of larger diameter than said first annular wall, said second annular wall being formed as a stepped extension of said first annular wall and extending away from said flat surface in a direction opposite to said post, such that said first and second annular walls define a shallow cup which includes said base member, and wherein said machine readable indicia comprise a first means in the form of a bar code affixed to the outer surface of said second annular wall, and a second means comrising a wall member located interior of said shallow cup, said wall member preventing attachment of said base member to all but a mating structure which is constructed to receive said wall member.

15. The canister of claim 14 wherein said cover is a deep cup-shaped, circular-cylinder cover of a diameter about equal to the diameter of said first annular wall, the lower planar rim of said cover including said cover latch means.

16. The canister of claim 15 wherein said cover includes a generally planar top of an outer diameter somewhat less than the inner diameter of said second annular wall.

17. The canister of claim 16 wherein the latch means of said base member and the latch means of said cover are coupled and uncoupled by relative rotation about the axis defined by said post, and key means formed in said shallow cup.

18. The canister of claim 17 including an internally located hollow, circular-cylinder boss, centrally located on the inside surface of said cover top, to thereby surround and loosely receive the top of said post when said cover is latched to said base member.

19. The canister of claim 18 including a compressible foam pad surrounding said boss, and being of a relaxed thickness so as to be compressed against the stack of disks as said cover is latched to said base member.

* * * * *